United States Patent
Zangi et al.

(10) Patent No.: US 8,238,303 B2
(45) Date of Patent: Aug. 7, 2012

(54) METHOD AND APPARATUS OF ALLOCATING SUBCARRIERS IN AN ORTHOGONAL FREQUENCY DIVISION MULTIPLEXING SYSTEM

(75) Inventors: Kambiz Zangi, Chapel Hill, NC (US); Erik Dahlman, Bromma (SE); Dennis Hui, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 785 days.

(21) Appl. No.: 12/324,073

(22) Filed: Nov. 26, 2008

(65) Prior Publication Data
US 2010/0128683 A1 May 27, 2010

(51) Int. Cl.
*H04J 3/00* (2006.01)
(52) U.S. Cl. ......... 370/330; 370/336; 370/344; 455/334
(58) Field of Classification Search .................. 370/330, 370/336, 344; 375/260, 341; 455/334
See application file for complete search history.

(56) References Cited

U.S. PATENT DOCUMENTS

| | | | |
|---|---|---|---|
| 2005/0220199 A1* | 10/2005 | Sadowsky et al. | 375/260 |
| 2007/0183386 A1 | 8/2007 | Muharemovic et al. | |
| 2009/0109835 A1* | 4/2009 | Green | 370/210 |
| 2009/0252112 A1* | 10/2009 | Shimomura et al. | 370/330 |
| 2010/0150000 A1* | 6/2010 | Sakata | 370/252 |
| 2010/0279707 A1* | 11/2010 | Fischer et al. | 455/456.1 |
| 2011/0135041 A1* | 6/2011 | Ezaki et al. | 375/341 |

OTHER PUBLICATIONS

Chengshan, Xiao et al. "Channel Equalization and Symbol Detection for Single Carrier Broadband MIMO Systems with Multiple Carrier Frequency Offsets" IEEE International Conference on Communications, 2008—ICC '08. May 19, 2008.

* cited by examiner

*Primary Examiner* — Yemane Mesfin
*Assistant Examiner* — Wanda Z Russell

(57) ABSTRACT

The present invention provides a method of generating mutually orthogonal reference signals for different user terminals in and OFDM system that span different but overlapping subcarriers. The subcarriers allocated to the user terminals are divided into a plurality of non-overlapping subcarrier blocks. Each user terminal is then allocated one or more subcarrier blocks. For each subcarrier block, a user terminal is assigned a reference signal comprising a base reference sequence and a linear phase rotation. To ensure mutual orthogonality among all user terminals, user terminals allocated the same subcarrier block use the same base reference sequence with different linear phase rotations.

20 Claims, 5 Drawing Sheets

METHOD AND APPARATUS OF ALLOCATING SUBCARRIERS IN AN ORTHOGONAL FREQUENCY DIVISION MULTIPLEXING SYSTEM

TECHNICAL FIELD

The present invention relates generally to channel estimation in a mobile communication system and, more particularly, to a set of mutually orthogonal reference signals with different bandwidth and overlapping spectrum.

BACKGROUND

In a mobile communication system, a base station receives signals from a plurality of user terminals. Two particularly attractive reception techniques for demodulating the symbols from multiple user terminals in each cell are successive interference cancellation (SIC) and interference rejection combining (IRC). Both of these reception techniques require the baseband receiver to estimate the channel between each user terminal and each antenna. The quality of the channel estimates greatly influences the performance of both SIC and IRC.

The network may receive signals from a user terminal at multiple network antennas. To receive a signal from a given user terminal, the network determines the set of network antennas that will be used to receive the signal transmitted from the user terminal. The signals received by this set of antennas are sent to a "uplink receiver" that demodulates the signal transmitted by the user terminal. Note that the same set of network antennas could be used for the reception of multiple user terminals.

The uplink receiver typically estimates the uplink channels between each user terminal and network antenna using reference signals that are transmitted from each user terminal on the uplink. In Release 8 of the LTE standard, at least one OFDM symbol in each 0.5 msec slot is devoted to the transmission of reference signals by all user terminals. The reference signal from each user terminal is transmitted over M consecutive sub-carriers. Assuming that M is greater than or equal to 72, the reference signal is a Zeda-Chu (ZC) sequence. There are 60 distinct base ZC sequences available in LTE.

When estimating the uplink channel from a particular user terminal, the reference signals from other user terminals act as interference and degrade the accuracy of the channel estimation. Therefore, it is generally desirable that the reference signals from all the user terminals be mutually orthogonal. In an LTE system, given one reference signal spanning consecutive subcarriers, a second orthogonal reference signal spanning the same subcarriers can be generated by adding a linear phase rotation to the same base reference signal. By using different phase rotations for different user terminals, a large number of mutually orthogonal reference signals spanning the same subcarriers can be generated. Currently, there is no method of ensuring mutual orthogonality of the reference signals in the scenario where the user terminals are allocated different but overlapping subcarriers.

SUMMARY

The present invention provides a set of reference signals for channel estimation that will remain orthogonal even when user terminals with different bandwidth are assigned overlapping subcarriers. The available subcarriers in an Orthogonal Frequency Division Multiplexing (OFDM) system are divided into a plurality of subcarrier blocks. Each user terminal is allocated one or more subcarrier blocks, which may partially overlap the subcarrier blocks assigned to a different user terminal. In the overlapping subcarriers, the reference signals assigned to different user terminals for use in the overlapping subcarriers are based on the same base reference sequence but have different linear phase rotations. Channel estimation is improved because the orthogonality of the reference signals will reduce the amount of interference in the reference signals received by the base station.

One exemplary embodiment of the present invention comprises a method implemented by a base station of allocating reference signals to be used in channel estimation in an OFDM system. The base station allocates a first set of subcarrier blocks to a first user terminal. The first set of subcarrier blocks may comprise one or more subcarrier blocks. The base station subsequently allocates a different set of subcarrier blocks to a second user terminal. The second set of subcarrier blocks includes at least one subcarrier block that is also allocated to the first user terminal (an overlapping subcarrier block) and at least one subcarrier block that is not allocated to the first user terminal (a non-overlapping subcarrier block). There may be one or more overlapping subcarrier blocks. The base station also assigns reference signals to the first and second user terminals. The assignment of reference signals to the first and second user terminals may take place at different points in time. In general, the assignment of a reference signal comprises the assignment of a base reference sequence and a linear phase rotation to apply to the base reference sequence. The reference signals assigned to the user terminals for use in an overlapping subcarrier block comprises the same base reference sequence with different linear phase rotations.

Another exemplary embodiment of the present invention comprises a base station in an OFDM system for allocating reference signals used in channel estimation. The base station comprises a transceiver for communicating with a plurality of user terminals, and a control unit operatively connected to said transceiver. The control unit allocates a first set of subcarrier blocks selected from a set of non-overlapping subcarrier blocks to a first user terminal and a second set of subcarrier blocks selected from said set of non-overlapping subcarrier blocks to a second user terminal. The subcarrier block allocation to said second user includes at least one subcarrier block not allocated to said first user terminal and at least one overlapping subcarrier block that is also allocated to said first user. The control unit also assigns reference signals to the first and second user terminals to be transmitted in respective ones of said subcarrier blocks. Each reference signal comprises a base reference sequence and a linear phase rotation in the frequency domain applied to the base reference sequence. The reference signals assigned the first and second user terminals in the overlapping subcarrier blocks use the same base reference sequence. The reference signals assigned the first and second user terminals in the overlapping subcarrier blocks have different linear phase rotations in the frequency domain.

One exemplary embodiment of the present invention comprises a method implemented by a user terminal in an OFDM system of transmitting reference signals to be used in channel estimation. A first user terminal transmits a first reference signal to a base station in a first subcarrier block that is also assigned to a second user terminal. The first reference signal comprises a base reference sequence that is the same as the base reference sequence used by the second user terminal in the first subcarrier block and a linear phase rotation in the frequency domain that is different than the linear phase rotation in the frequency domain used by the second user terminal in the first subcarrier block. The first user terminal also transmits a second reference signal from a first user terminal to the base station in a second subcarrier block not assigned to the second user terminal.

Another exemplary embodiment of the present invention comprises a user terminal that is configured to transmit reference signals on the uplink that are used in channel estimation by a base station. The user terminal comprises a transceiver and a control unit for controlling the transceiver. The control unit causes the transceiver to transmit a first reference signal to a base station in a first subcarrier block that is also assigned to a second user terminal. The first reference signal comprising a base reference sequence that is the same as the base reference sequence used by the second user terminal in the first subcarrier block, and a linear phase rotation in the frequency domain that is different than the linear phase rotation in the frequency domain used by the second user terminal in the first subcarrier block. The control unit further causes the transceiver to transmit a second reference signal to the base station in a second subcarrier block not assigned to the second user terminal.

DETAILED DESCRIPTION

Figure 1:
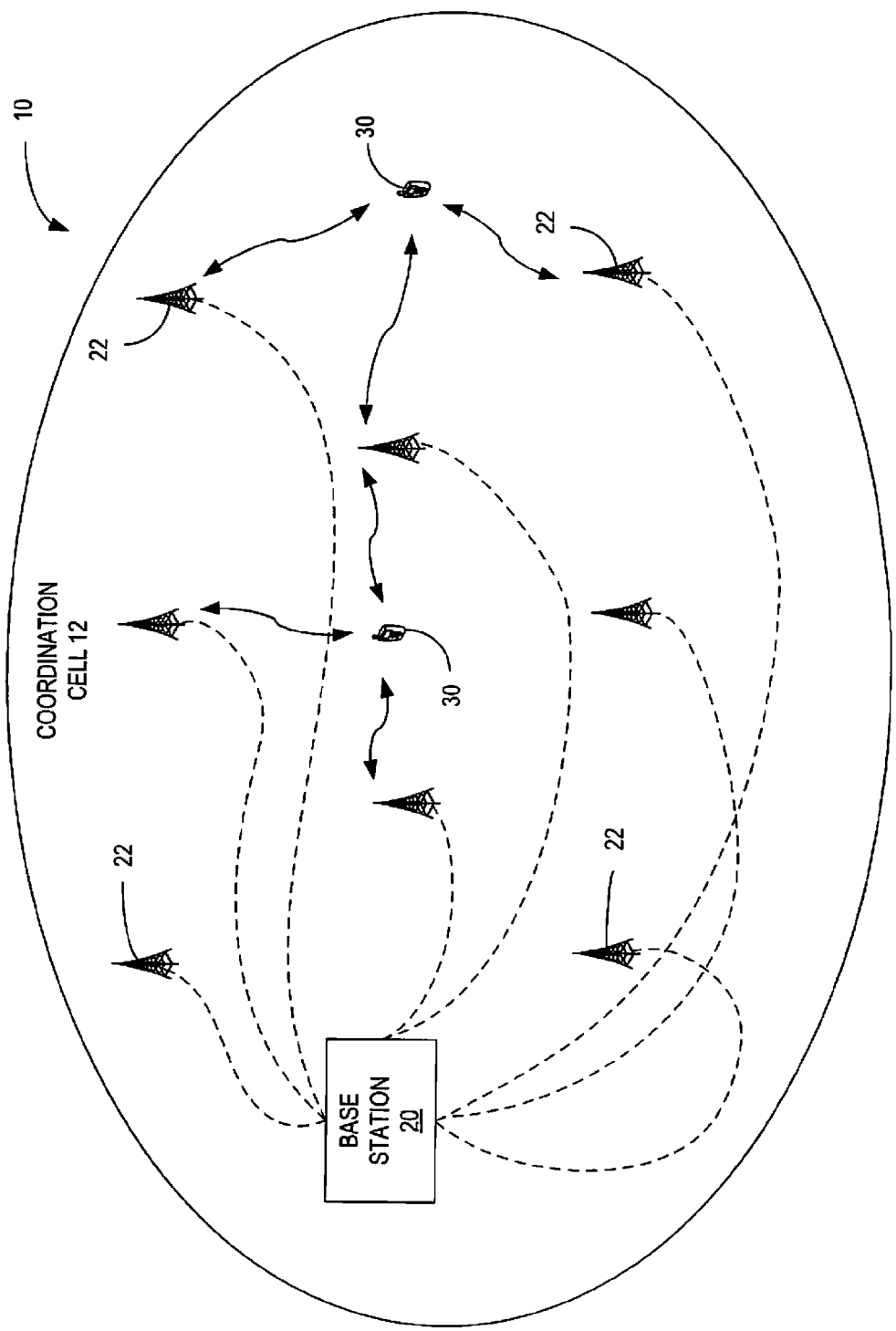
FIG. 1 illustrates a cell in an exemplary communication system with a single base station connected to multiple antennas at geographically separate locations.

Referring now to the drawings, the present invention will be described in the context of an exemplary mobile communication system 10 based on the Long Term Evolution (LTE) standards being developed by the Third Generation Partnership Project (3GPP). FIG. 1 shows one possible configuration of the network 10 that is permitted by the LTE standard, however, other configurations are also permitted. Those skilled in the art will appreciate, however, that the present invention may also be used in mobile communication systems 10 based on other standards now known or later developed. Thus, the following description should be viewed as illustrative, and not limiting.

FIG. 1 illustrates one coordination cell 12 of the communication system 10 which connects to a core network (not shown). A base station 20, called an eNodeB in the LTE standard, communicates with a plurality of user terminals 30. In the exemplary embodiment, the base station 20 connects via fiber to a plurality of antennas 22 that are distributed throughout the cell 12. Alternatively, the antennas 22 could be located at the same site. The base station 20 uses a reception technique called coordinated multipoint (COMP) to improve reception of signals from the user terminals 30 on the uplink. More specifically, base station 20 uses antennas 22 at multiple sites to demodulate the symbols transmitted by different user terminals 30 on the uplink. Two particularly attractive multi-user reception techniques for demodulating the symbols from multiple user terminals 30 in each cell 12 are successive interference cancellation (SIC) and interference rejection combining (IRC). Both SIC and IRC require the baseband receiver to estimate the channel between each user terminal 30 and each antenna 22. The quality of the channel estimates greatly influences the performance of both reception techniques.

The baseband receiver typically estimates the uplink channels using reference signals (RSs) that are transmitted from each user terminal 30 on the uplink. In Release 8 of the LTE standard, one OFDM symbol in each 0.5 msec slot is devoted to transmission of reference signals by all user terminals 30. The reference signal from each user terminal 30 is transmitted over M consecutive sub-carriers. Assuming that M is greater than or equal to 72, the reference signal is a Zeda-Chu (ZC) sequence. There are 60 distinct base ZC sequences available in LTE.

When estimating the uplink channel from a particular user terminal 30, the reference signals from other user terminals 30 act as interference and degrade the accuracy of the channel estimation. Therefore, it is generally desirable that the reference signals from all user terminals 30 be mutually orthogonal. In an LTE system, given one reference signal spanning M consecutive subcarriers, a second orthogonal reference signal spanning the same M subcarriers may be generated by adding a linear phase rotation to the same base reference signal. By using different phase rotations for different user terminals 30, a large number of mutually orthogonal reference signals spanning the same M subcarriers may be generated. Currently, there is no method of ensuring mutual orthogonality of the reference signals in the scenario where the user terminals 30 are allocated different but overlapping subcarriers.

The present invention provides a method of generating mutually orthogonal reference signals for different user terminals 30 that span different but overlapping subcarriers. The subcarders allocated to the user terminals 30 are divided into a plurality of non-overlapping subcarrier blocks. As one example, the subcarriers may be divided into blocks of M=72 subcarriers. Each user terminal 30 is then allocated one or more subcarrier blocks. The subcarrier blocks allocated to a given user terminal 30 may be contiguous. However, those skilled in the art will appreciate that the subcarrier blocks assigned to a given user terminal 30 are not required to be contiguous. For each subcarrier block, user terminal 30 is assigned a base reference sequence of length M. For simplicity, a user terminal 30 may use the same base reference sequence for each of its allocated subcarrier blocks. However, it is not required that the user terminals 30 use the same base reference sequence in each of its allocated subcarrier blocks. To ensure mutual orthogonality among all user terminals 30, user terminals 30 allocated the same subcarrier block use the same base reference sequence with different linear phase rotations.

Figure 2:
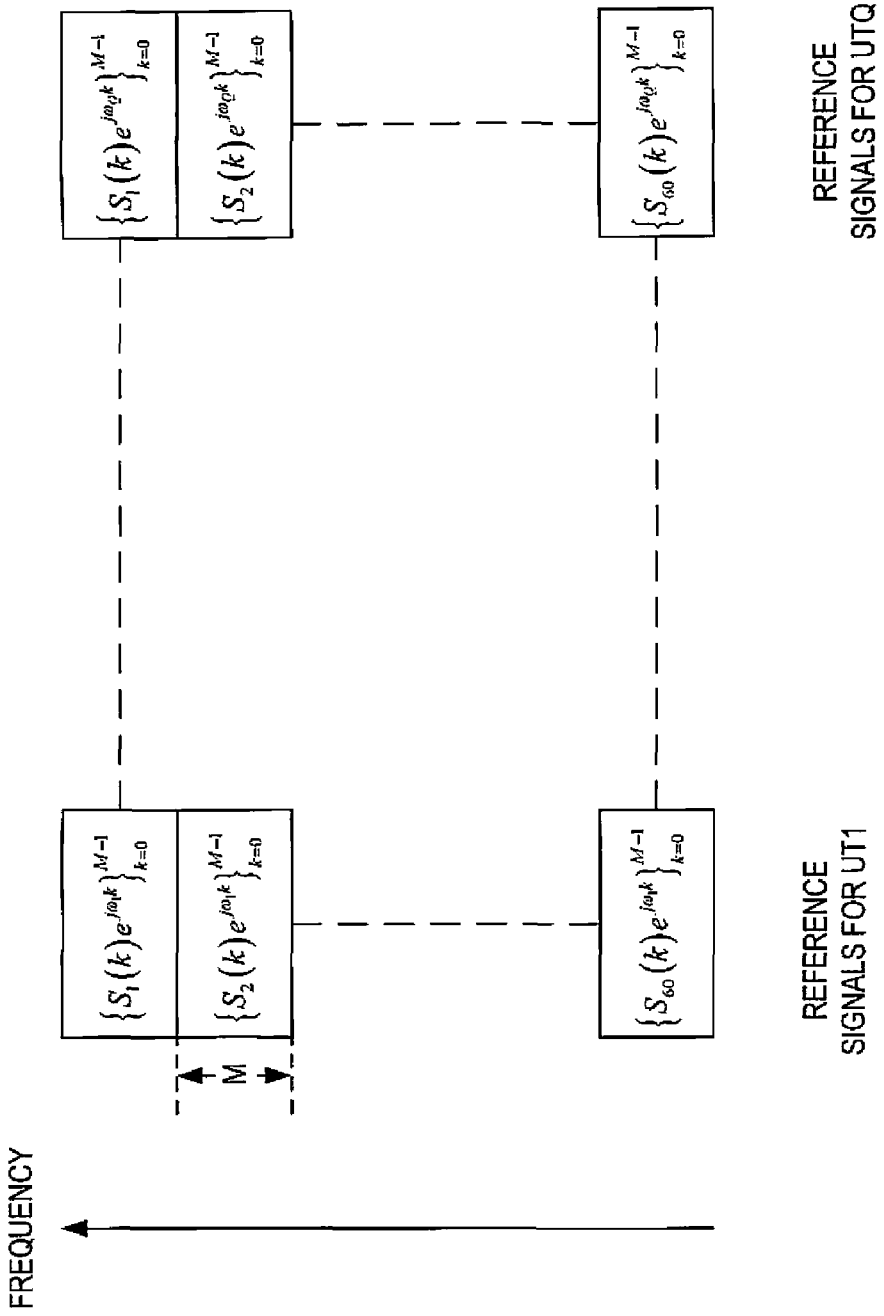
FIG. 2 illustrates an exemplary structure for reference signals suitable for an OFDM system.

FIG. 2 illustrates the structure of the reference signals transmitted from the user terminals 30 according to one exemplary embodiment of the present invention. As noted previously, there are 60 different ZC base reference sequences. The $i^{th}$ ZC base reference sequence may be denoted by:

$$S_i(k), k=0,\ldots,M-1. \quad \text{Eq. (1)}$$

The reference signal to be transmitted by the $q^{th}$ user terminal 30 in the $i^{th}$ subcarrier block is then given by:

$$S_i(k)e^{j\omega_q k}, k=0,\ldots,M-1, \quad \text{Eq. (2)}$$

where $e^{j\omega_q k}$ is the linear phase rotation term.

Assuming that there are a total of Q linear phase rotations (depending on the frequency-selectivity of the channel), Q reference signals may be generated in each subcarrier block for a total of Q user terminals 30. The user terminal 30 may transmit the reference signals over the same subcarriers used to transmit data symbols, or over a different set of subcarriers.

The Q reference signals generated according to the above procedure will always be mutually orthogonal regardless of the number of subcarrier blocks that are allocated to each user terminal 30. Furthermore, each of the above reference signals will have a perfect auto-correlation in the time domain because the magnitude of the Fourier Transform of each reference signal is constant over all sub-carriers. Over each subcarrier block, the reference signals for different user terminals 30 are formed by different phase rotations of the same basic ZC sequence, and different phase rotations of the same ZC sequence are known to be mutually orthogonal. Reference signals for two different user terminals 30 that are transmitted on non overlapping subcarriers are obviously always orthogonal.

The set of reference signals shown in FIG. 2 remains mutually orthogonal as long as all the reference signals used in any given subcarrier block are phase rotated versions of the same ZC base reference sequence of length M (e.g., all the sequences in each row of FIG. 2 must be phase rotated versions of the same base ZC sequence). A small subset of ZC base reference sequences may be used in all the subcarrier blocks such that many subcarrier blocks will use the same ZC base reference sequence. Assuming that only N base ZC sequences are used on all the subcarrier blocks, any of the N base reference sequences may be assigned to each subcarrier block. This freedom may then be used to reduce the peak-to-average ratio of the resulting reference signals in the time domain.

To maintain backward compatibility, it is important that the reference signals generated by Release 8 user terminals 30 be different from reference signals used by user terminals 30 operating according to subsequent releases of the LTE standard. One way of achieving backward compatibility is to reserve a subset of linear phase shifts for the Release 8 user terminals 30, and to reserve a different subset of linear phase shifts for user terminals 30 operating according to subsequent releases of LTE. Thus, a Release 8 user terminal 30 transmitting over any number of subcarriers will never transmit the same reference signal as the reference signal transmitted by a user terminal 30 operating according to subsequent releases of the LTE standard.

Another way of ensuring backward compatibility is by using a pseudorandom, binary scrambling sequence for user terminals 30 operating according to subsequent releases of the LTE standard. As long as all the reference signals in LTE Release 9+ have the same scrambling sequence, these reference signals will remain mutually orthogonal. Further, the scrambling sequence ensures that the reference signals in FIG. 2 are always distinct from the reference signals used in LTE Release 8.

The present invention provides a set of reference signals for uplink channel estimation that will remain orthogonal even when the user terminals 30 with different bandwidth are assigned overlapping subcarriers In the overlapping subcarriers, the reference signals assigned to the different user terminals 30 for use in the overlapping subcarriers are based on the same base reference sequence but have different linear phase rotations. Channel estimation is improved because the orthogonality of the reference signals will reduce the amount of interference in the reference signals received by the base station 20.

Figure 3:
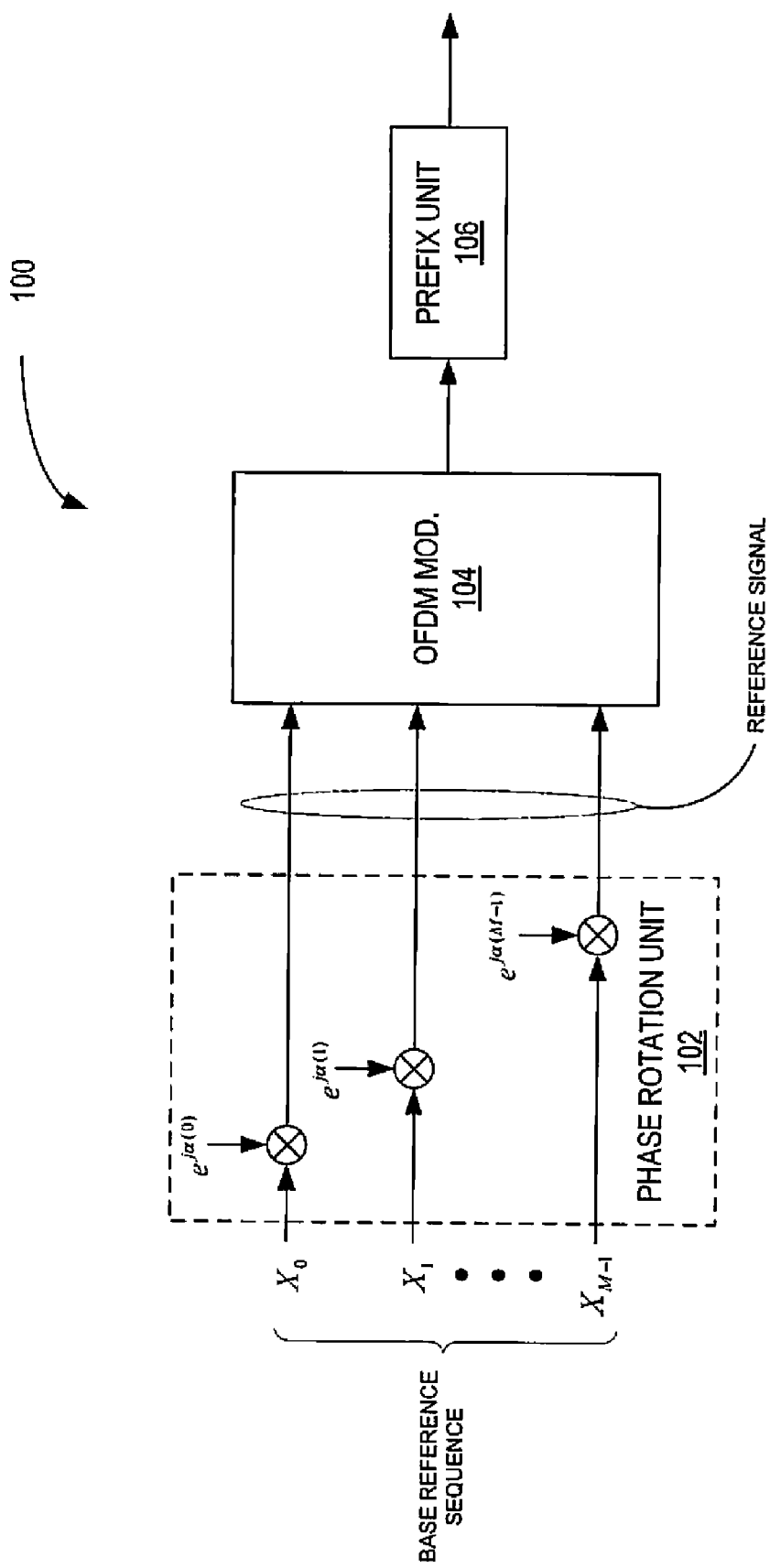
FIG. 3 illustrates the generation of reference signal by an exemplary transmitter in a user terminal.

FIG. 3 illustrates how an OFDM transmitter 100 generates the reference signals in one exemplary embodiment of the invention. For simplicity, only one reference signal for one subcarrier block is illustrated. The ZC base reference sequence $X=\{X_0, X_1, \ldots X_{M-1}\}$ is input to phase rotation unit 102 of the OFDM transmitter 100. The phase rotation unit 102 adds a linear phase rotation $\{\alpha(0), \alpha(1), \ldots, \alpha(M-1)\}$ to the respective elements of the base reference sequence to generate the reference signal that is transmitted to the base station 20. The reference signal output from the phase rotation unit 102 is input an OFDM modulator 104, which transforms the reference signal from the frequency domain to the time domain. A prefix unit 106 adds a cyclic prefix to the time domain reference signal before transmission to the base station 20.

Figure 4:
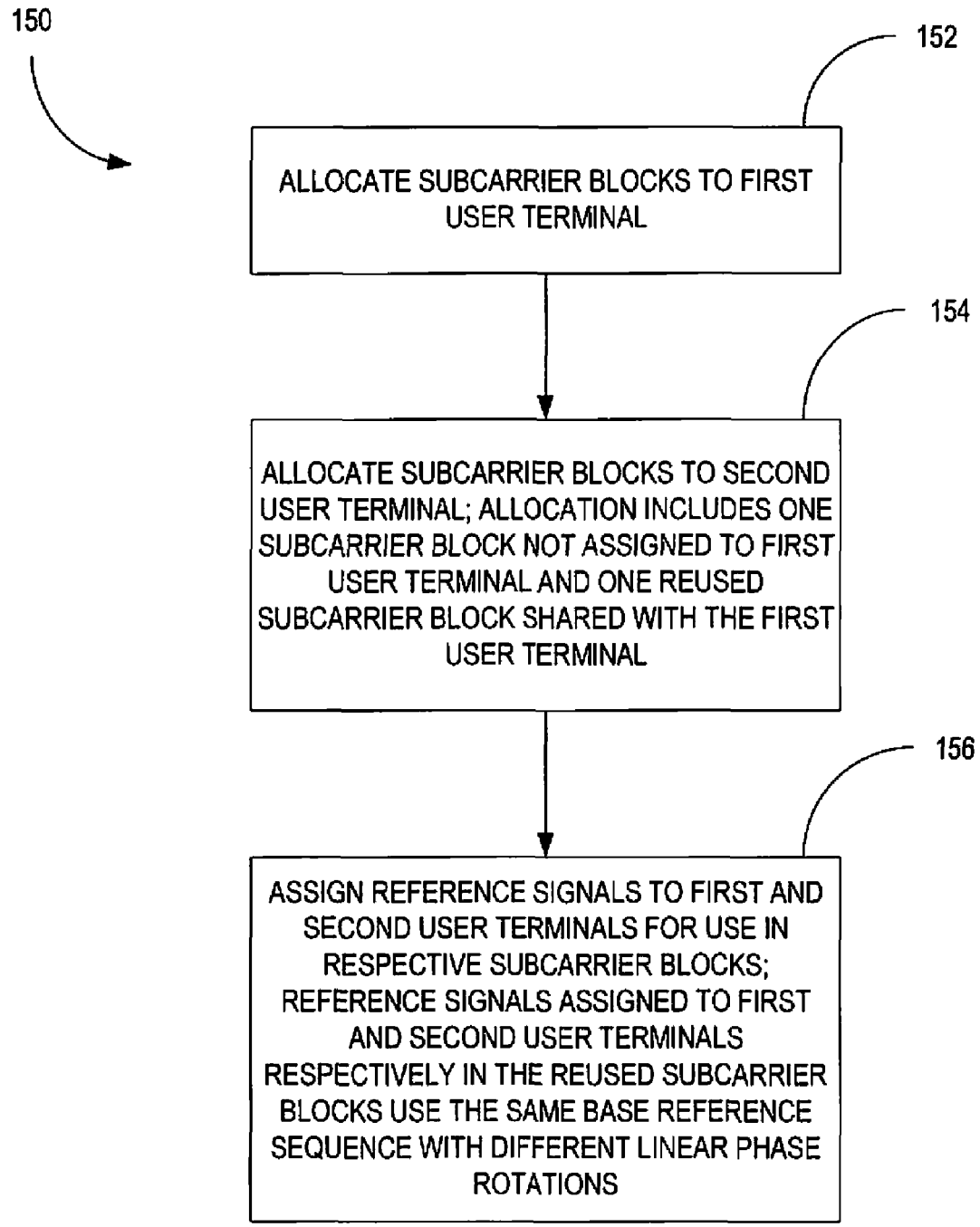
FIG. 4 illustrates an exemplary method implemented by a base station of allocating reference signals to user terminals.

FIG. 4 illustrates an exemplary method 150 of allocating reference signals to user terminals 30 according to one embodiment of the invention. This method may be implemented by a base station 20, which has knowledge of the reference signals used by each user terminal 30. The base station 20 allocates a first set of subcarrier blocks to a first user terminal 30 (block 152). The first set of subcarrier blocks may comprise one or more subcarrier blocks. The base station 20 subsequently allocates a different set of subcarrier blocks to a second user terminal 30 (block 154). The second set of subcarrier blocks includes at least one subcarrier block that is also allocated to the first user terminal (an overlapping subcarrier block) and at least one subcarrier block that is not allocated to the first user terminal 30 (a non-overlapping subcarrier block). There may be one or more overlapping subcarrier blocks. The base station 20 also assigns reference signals to the first and second user terminals 30 (block 156). The assignment of reference signals to the first and second user terminals 30 may take place at different points in time. In general, the assignment of a reference signal comprises the assignment of a base reference sequence and a linear phase rotation to apply to the base reference sequence. The reference signals assigned to the user terminals 30 for use in an overlapping subcarrier block comprises the same base reference sequence with different linear phase rotations.

Figure 5:
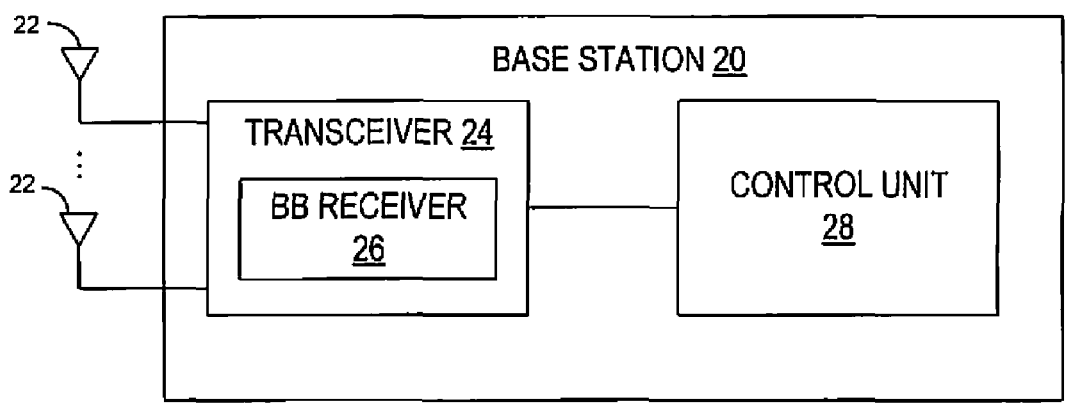
FIG. 5 illustrates an exemplary base station for allocating reference signals to user terminals.

FIG. 5 illustrates an exemplary base station 20 for receiving signals from a plurality of user terminals 30 according to one embodiment. The base station 20 comprises a transceiver 24 having baseband receiver 26 to detect signals from multiple user terminals 30 and a control unit 28. The baseband receiver 26 may use SIC or IRC to demodulate the received signals from the user terminals 30. Baseband receiver 26 estimates the channel from each user terminal 30 based on the reference signals transmitted by the user terminals 30 and demodulates the data signals from the user terminals 30 using these channel estimates. Control unit 28 comprises one or more processors, hardware, or a combination thereof for controlling the operation of the base station 20. The functions of the control unit 28 include allocation of subcarrier blocks and reference signals to the user terminals 30 as hereinabove described including the method shown in FIG. 4.

Figure 6:
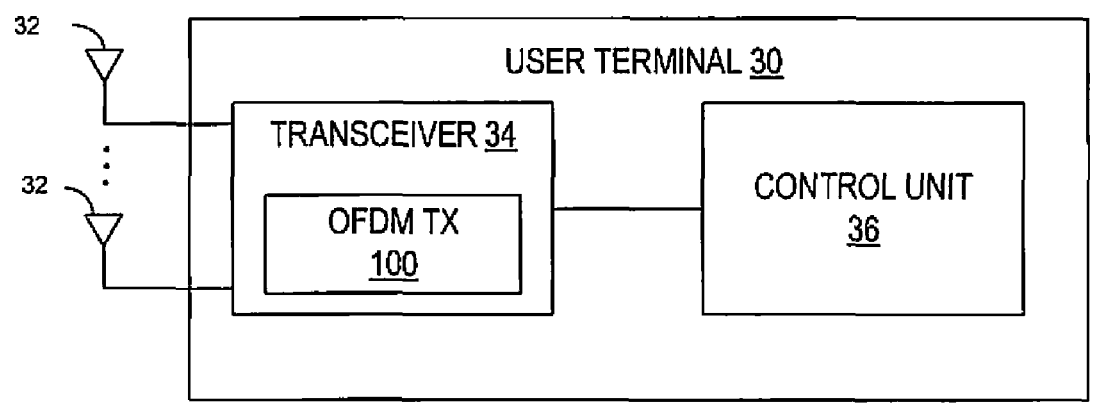
FIG. 6 illustrates an exemplary user terminal configured to transmit reference signal to a network.

FIG. 6 illustrates an exemplary user terminal 30 configured to transmit reference signals according to the present invention. The user terminal 30 comprises a transceiver 34 with one or more antennas 32, and a control unit 36. Transceiver 34 includes an OFDM transmitter 100 as shown in FIG. 3, which may operate according to the LTE standard. Control unit 36 comprises one or more processors, hardware, or a combination thereof for controlling the operation of the user terminal 30. The control unit 36 determines the reference signals to be transmitted based on control signals received from the base station 20 and causes the transceiver 34 to transmit the control signals to the base station 20.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of allocating subcarriers to user terminals in an orthogonal frequency division multiplexing system, said method comprising:
    allocating a first set of subcarrier blocks selected from a set of non-overlapping subcarrier blocks to a first user terminal;
    allocating a second set of subcarrier blocks selected from said set of non-overlapping subcarrier blocks to a second user terminal, wherein the second set of subcarrier blocks includes at least one subcarrier block not allocated to said first user terminal, and at least one reused subcarrier block that is also allocated to said first user;
    assigning reference signals to said first and second user terminals to be transmitted in respective ones of said subcarrier blocks, each said reference signal comprising a base reference sequence and a linear phase rotation in the frequency domain applied to the base reference sequence;
    wherein the reference signals assigned the first and second user terminals in said reused subcarrier block use the same base reference sequence; and
    wherein the reference signals assigned the first and second user terminals in said reused subcarrier block have different linear phase rotations in the frequency domain.

2. The method of claim 1 wherein the linear phase rotation assigned the first user terminal is the same for all subcarrier blocks.

3. The method of claim 1 wherein the subcarrier blocks in said set of non-overlapping subcarrier blocks each have the same number of subcarriers.

4. The method of claim 1 wherein the base reference sequences comprise Zeda Chu sequences.

5. The method of claim 1 wherein said subcarrier blocks assigned to at least one of said first and second user terminals are non-contiguous.

6. A base station comprising:
    a transceiver for communicating with a plurality of user terminals;
    a control unit operatively connected to said transceiver and configured to:
    allocate a first set of subcarrier blocks selected from a set of non-overlapping subcarrier blocks to a first user terminal;
    allocate a second set of subcarrier blocks selected from said set of non-overlapping subcarrier blocks to a second user terminal, wherein the second set of subcarrier blocks includes at least one subcarrier block not allocated to said first user terminal, and includes at least one reused subcarrier block that is also allocated to said first user;
    assign reference signals to said first and second user terminals to be transmitted in respective ones of said subcarrier blocks, each said reference signal comprising a base reference sequence and a linear phase rotation in the frequency domain applied to the base reference sequence;
    wherein the reference signals assigned the first and second user terminals in said reused subcarrier blocks use the same base reference sequence; and
    wherein the reference signals assigned the first and second user terminals in said reused subcarrier blocks have different linear phase rotations in the frequency domain.

7. The base station of claim 6 wherein the control unit is configured to assign to the first user terminal, the same linear phase rotation for all subcarrier blocks.

8. The base station of claim 6 wherein the subcarrier blocks in said set of non-overlapping subcarrier blocks each have the same number of subcarriers.

9. The base station of claim 6 wherein the base reference sequences comprise Zeda Chu sequences.

10. The base station of claim 6 wherein the control unit is configured to assign non-contiguous subcarrier blocks to at least one of said first and second user terminals.

11. A method of transmitting reference signals for channel estimation from a user terminal to a base station in an orthogonal frequency division multiplexing system, said method comprising:
    transmitting a first reference signal from a first user terminal to said base station in a first subcarrier block that is also assigned to a second user terminal, said first reference signal comprising a base reference sequence that is the same as the base reference sequence used by the second user terminal in the first subcarrier block and a linear phase rotation in the frequency domain that is different than the linear phase rotation in the frequency domain used by the second user terminal in the first subcarrier block; and
    transmitting a second reference signal from a first user terminal to said base station in a second subcarrier block not assigned to the second user terminal.

12. The method of claim 11 wherein the second reference signal comprises a base reference sequence different than the first reference signal and a linear phase rotation the same as the first reference signal.

13. The method of claim 11 wherein the first and second subcarrier blocks are non-contiguous.

14. The method of claim 11 wherein the first and second subcarrier blocks have an equal number of subcarriers.

15. The method of claim 11 wherein the base reference sequence comprises a Zeda Chu sequence.

16. A user terminal comprising:
    a transceiver;
    a control unit for controlling the transceiver to cause the transceiver to:
    transmit a first reference signal from a first user terminal to said base station in a first subcarrier block that is also assigned to a second user terminal, said first reference signal comprising a base reference sequence that is the same as the base reference sequence used by the second user terminal in the first subcarrier block and a linear phase rotation in the frequency domain that is different than the linear phase rotation in the frequency domain used by the second user terminal in the first subcarrier block; and
    transmit a second reference signal from a first user terminal to said base station in a second subcarrier block not assigned to the second user terminal.

17. The user terminal of claim 16 wherein the second reference signal comprises a base reference sequence different than the first reference signal and a linear phase rotation the same as the first reference signal.

18. The user terminal of claim 16 wherein the first and second subcarrier blocks are non-contiguous.

19. The user terminal of claim 16 wherein the first and second subcarrier blocks have an equal number of subcarriers.

20. The user terminal of claim 16 wherein the base reference sequence comprises a Zeda Chu sequence.

* * * * *

UNITED STATES PATENT AND TRADEMARK OFFICE
CERTIFICATE OF CORRECTION

PATENT NO. : 8,238,303 B2
APPLICATION NO. : 12/324073
DATED : August 7, 2012
INVENTOR(S) : Zangi et al.

Page 1 of 1

It is certified that error appears in the above-identified patent and that said Letters Patent is hereby corrected as shown below:

In Column 4, Line 34, delete "subcarders" and insert -- subcarriers --, therefor.

Signed and Sealed this
Fifth Day of February, 2013

Teresa Stanek Rea
*Acting Director of the United States Patent and Trademark Office*